R. P. WHITE.
TANK CAR.
APPLICATION FILED FEB. 24, 1919.

1,313,361.

Patented Aug. 19, 1919.
2 SHEETS—SHEET 1.

Inventor:
Richard P. White
By Gillson & Gillson
Attys.

R. P. WHITE.
TANK CAR.
APPLICATION FILED FEB. 24, 1919.
1,313,361.
Patented Aug. 19, 1919.
2 SHEETS—SHEET 2.
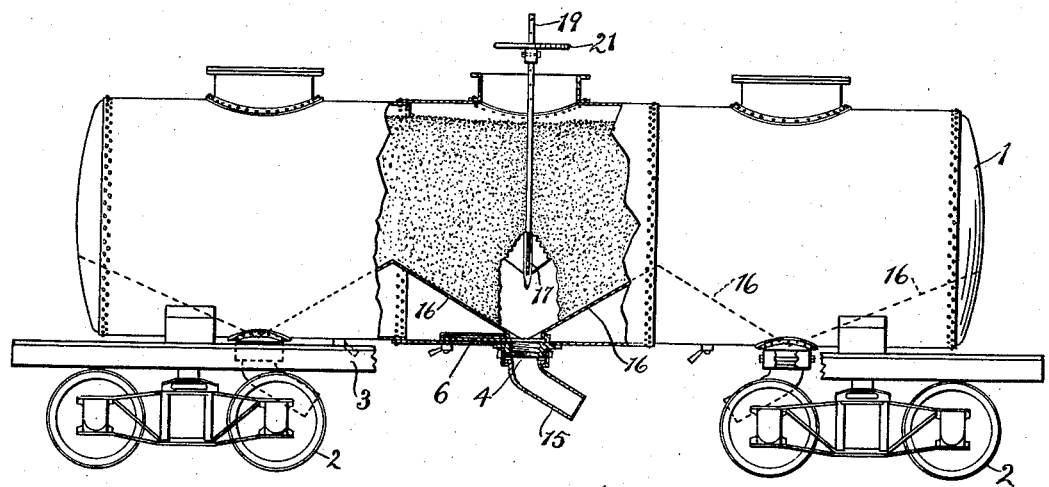
Fig.4.
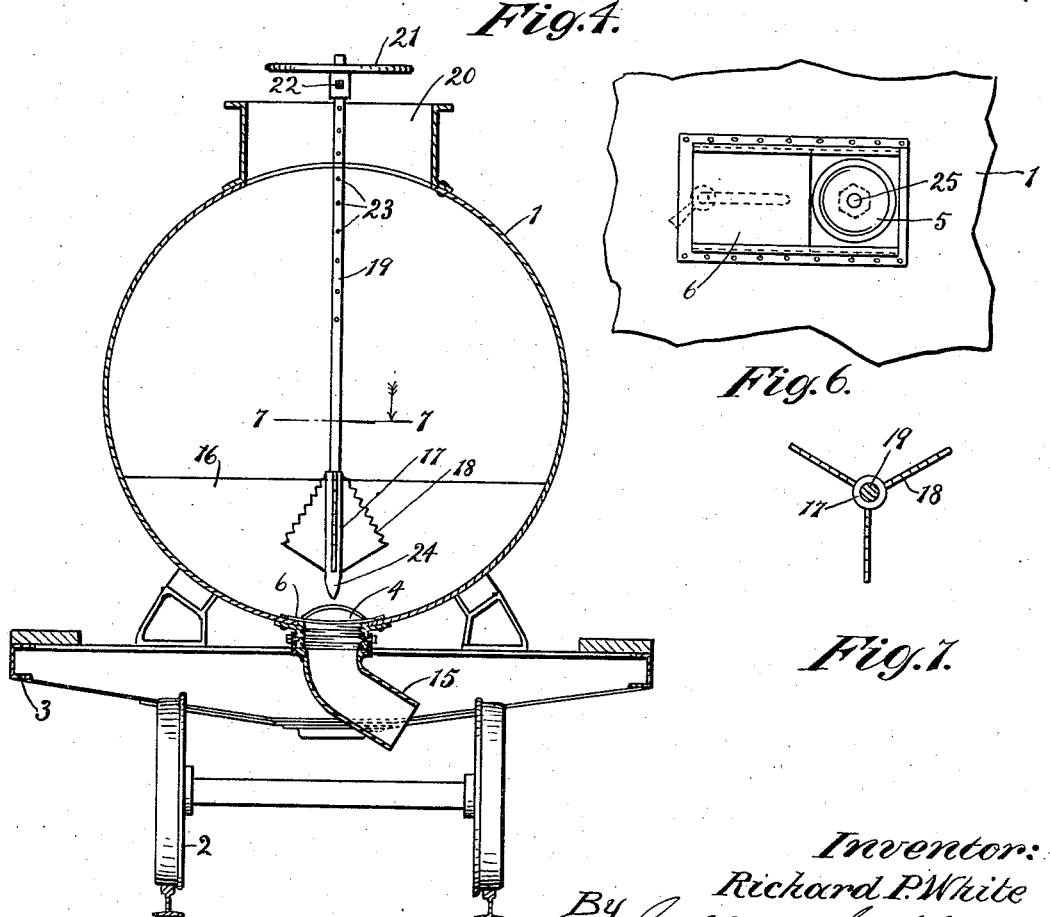
Fig.5.
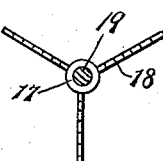
Fig.6.
Fig.7.
Inventor:
Richard P. White
By Gillson & Gillson
Att'ys.

UNITED STATES PATENT OFFICE.

RICHARD P. WHITE, OF CHICAGO, ILLINOIS.

TANK-CAR.

1,313,361.  Specification of Letters Patent.  Patented Aug. 19, 1919.

Application filed February 24, 1919. Serial No. 278,950.

*To all whom it may concern:*

Be it known that I, RICHARD P. WHITE, a citizen of the United States, and resident of Chicago, county of Cook, and State of Illinois, have invented certain new and useful Improvements in Tank-Cars, of which the following is a specification, and which are illustrated in the accompanying drawings, forming a part thereof.

The invention relates to tank cars and an object of the invention is the provision of a tank car for the conveyance of dry Portland cement, sugar, or other finely divided material in bulk. An object of the invention is the provision of such a tank car from which the material will flow by gravity and will thus discharge itself substantially completely.

In the accompanying drawings.

Figure 1:
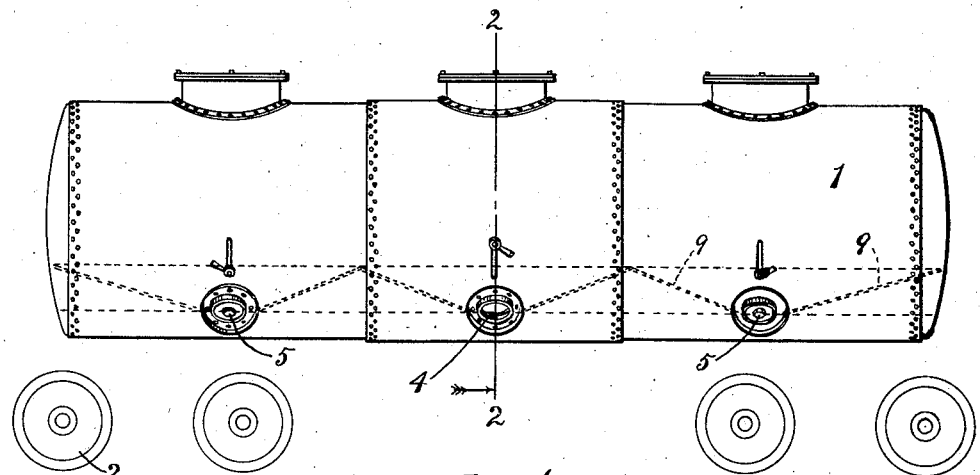
Figure 1 is a side view of a tank car showing an embodiment of the invention.
Figure 3:
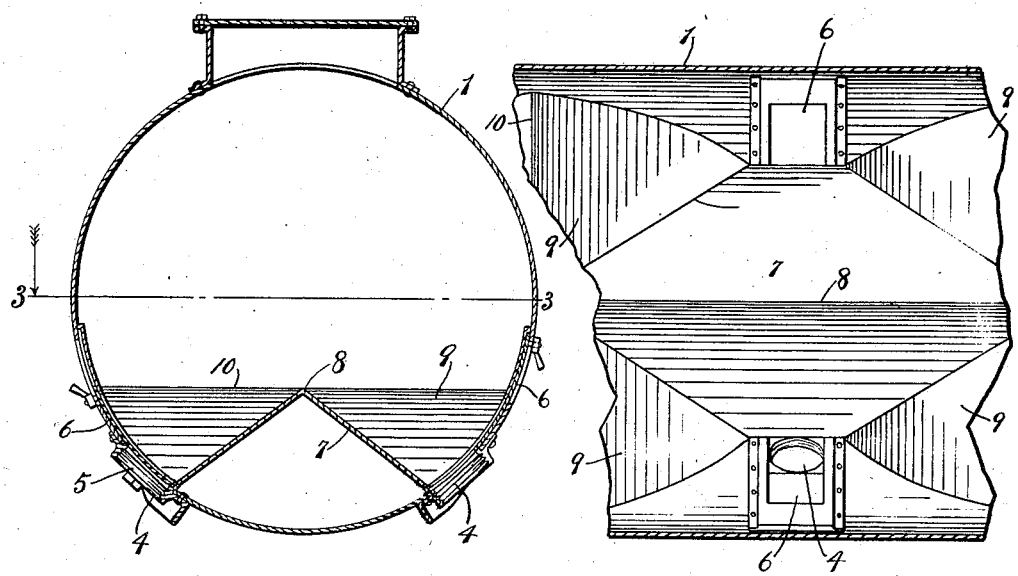
Figure 2:
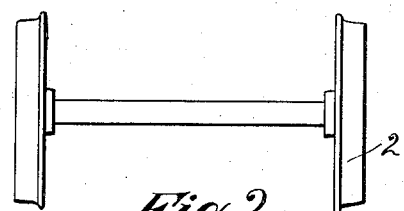
Fig. 2 is a transverse vertical section on line 2—2 of Fig. 1.

Fig. 3 is a longitudinal section on line 3—3 of Fig. 2 on an enlarged scale, looking down upon the interior of the tank body, showing a portion only thereof, Fig. 4 is a side view of a modification, portions being broken away to show a longitudinal section of the interior, Fig. 5 is a vertical transverse section through one of the outlet openings shown in Fig. 4, Fig. 6 is a plan view of one of the outlets, and Fig. 7 is a cross section taken on the line 7—7 of Fig. 5.

In the drawings 1 refers generally to the tank car body. This body is mounted upon the usual running gear and underframe indicated generally at 2 and 3. As this forms no part of the present invention the showing thereof is purely diagrammatical.

A series of openings 4 are shown in the lower portion of the tank and there is preferably provided a series of such openings at each side of the car body, as indicated in Figs. 2 and 3. These openings are provided with screw closures, as 5 for the retention of the material while the car is in transit and with a sliding gate arrangement 6 for cutting off the discharge while the car is being emptied. The provision of these gates 6 is for the purpose of stopping the flow of material while the vessel into which the material is being discharged is taken away when filled and an empty vessel put in its place. These closure means are described and claimed in my prior Patent No. 1,165,736 patented December 28, 1915.

Within the car body is deflector 7 which deflector presents a raised portion 8 extending centrally and longitudinally of the bottom portion of the tank and the lower edge of the deflector coincides with the lower edges of the series of openings. Obviously, the deflector plates 7 in combination with the downward and inwardly directed cylindrical wall of the tank will produce a hopper shaped bottom to the storage space within the tank and thus direct material to the openings 4.

The provision of deflector 7 alone would leave spaces between the openings of the series wherein material would collect assuming its angle of repose and would require that the material be raked to the opening for discharge. To obviate this, transverse deflectors 9, each presenting a raised portion, as 10, are shown and raised portion 10 is preferably at an equal elevation with that of raised portion 8. These deflectors 9 each extend to the point where the deflector 7 meets one of the discharge openings 4. Therefore each of the openings 4 will be found to occupy a position at the bottom of a hopper shaped area and the material from the car will be substantially entirely discharged by gravity when each of the series of openings 4 has been drawn upon. The importance of this discharge by gravity resides in the difficulty of discharge of such material as dry cement by any other means since the cement being in such finely divided condition makes it impossible for a workman to go down into the tank body to push the cement to discharge openings and in the case of such material as sugar such action would be objectionable for sanitary reasons. Also the raking of material to the openings, if the same were rendered necessary by the omission of my deflecting means, would lead to waste of material and time.

The presence of my deflector or deflectors in a tank car will have the added function of stiffening and strengthening the structure. It is common in this type of car to depend upon the body of the tank itself for connection of the trucks with each other, as well as for resistance to the "train stresses," that is transmission of the pull or the push of the locomotive from one car to another. The resistance of the tank body to these stresses, acting with the weight of material in the tank, tending to bend the tank down in the middle, will be greatly aided by my improvement, since the raised deflector will stiffen the tank as a corrugation will stiffen an otherwise plain sheet of metal.

A modification of my device is shown in Figs. 4 to 7 inclusive. In this modification the outlet openings are shown in the bottom of the tank body, at 4, Figs. 4 and 5, and will be provided with the screw closures 5 not shown. These closures, formed as shown in the other modification, must be removed from the exterior of the tank before the application of spouts 15. Spouts 15 are provided for the purpose of directing the discharging material to either side of the car or to any convenient point for its reception. The deflectors shown in this modification at 16 extend crosswise of the car only with their lower edges adjacent the opening and the sliding closure 6 in this modification will, as shown in Fig. 4, occupy the space inside the tank body under the deflectors 16. In order to loosen the material should the same be tightly packed, or should it arch during discharge, I have illustrated an agitating tool 17, which tool has members projecting therefrom at 18, shown as wings with serrated edges. Mere projections of any kind, such as pins, would perform the function suitably and I do not wish to be limited to the exact form of agitating tool illustrated. The shaft of the tool 19 is long enough to extend to one of the inlet openings, as 20, in the top of the tank body and for convenience in manipulation I have shown a handle which may be in the form of a wheel 21 applied to shaft 19. Handle 21 is shown applied to the shaft 19 by an adjustable attachment, as pin 22, passing through openings in the shaft 23.

As the tool is raised in the manner illustrated in Fig. 4, the handle 21 may be adjusted downward on the shaft as so to be at a convenient height for operation. Preferably the lower end of the shaft 19 is pointed, as shown at 24, and is placed in the tank before the material to be shipped is loaded. To prevent the tool from being misplaced into some position where it will be ineffective a depression 25 in the top of the closure 5, as shown in Fig. 6, is provided. When the tool is in place with its point in depression 25, the end of the shaft will come below the level of the inlet opening 20 so that the cover may be applied.

When it is desired to discharge the material from the tank the cover of opening 20 may be removed and tool 17 raised and twisted, the closure 5 having been removed. This manipulation of the tool will loosen the material and cause its discharge from the opening. The action of the tool is to destroy the keystone of the arch formed by the material, as well as to loosen it from its packed condition. It is thought that the operation of the device will be clear from the above description.

I claim as my invention:

1. A tank car for conveying finely divided material comprising a cylindrical tank body closed at its ends, a series of discharge openings in the wall of said body and a deflector plate in the lower portion of said body with its lower edge at the bottom of said openings whereby material will be deflected to and discharged by gravity from said openings.

2. A tank car for conveying finely divided material comprising a cylindrical tank body closed at its ends, the walls of said body having a series of discharge openings, deflector plates in the lower portion of said body arranged transversely thereof with their lower edges terminating adjacent said openings, and closures for said openings.

3. A tank car for conveying finely divided material comprising a cylindrical tank body closed at its ends, the walls of said body having a series of discharge openings, deflector plates in the lower portion of said body arranged transversely thereof with their lower edges terminating adjacent said openings, closures for said openings, and means in said tank to agitate material to facilitate its discharge from said openings.

4. In a tank car, in combination, a tank body having openings in the lower portion thereof, closures for said openings, an agitating tool to facilitate discharge of material from said opening comprising a vertical shaft, a handle vertically adjustable on said shaft and members projecting from the lower portion of said shaft whereby when said tool is placed in proximity to said discharge opening then lifted and turned, packed material will be loosened for discharge from said opening.

RICHARD P. WHITE.